United States Patent Office 3,510,260
Patented May 5, 1970

3,510,260
METHOD FOR DETERMINING ACID CONTENT OF OIL SAMPLE
Arthur Altshuler Krawetz, Evanston, and Theodore Tovrog, Chicago, Ill., assignors to Henry Valve Company, Melrose Park, Ill., a corporation of Illinois
No Drawing. Filed July 6, 1965, Ser. No. 469,834
Int. Cl. G01m *31/22, 33/28*
U.S. Cl. 23—230                    7 Claims

ABSTRACT OF THE DISCLOSURE

A method for field testing lubricating oils to determine whether their acid content is greater than a predetermined level. The oil sample to be tested is combined with a predetermined amount of an alkaline solution of known normality, the alkaline solution having a diluent constituent which is substantially immiscible with the oil sample and having the further characteristic of not interfering with the observation of a color change of a color indicator solution. A solvent substantially equally soluble in said oil sample and alkaline solution which permits ready transfer of the acid in the oil sample to the diluent phase of the alkaline solution is combined with the oil sample-alkaline solution mixture. A particularly desirable solvent is composed of 50% toluene, 49.5% isopropanol and 0.5% distilled water (all percentages being based on volume). Other desirable solvents which can be used alone or in conjunction with the above preferred mutual solvent include acetone, methylethyl ketone, methanol, and ethanol, as well as other materials which exhibit a similar affinity for both water and oil. A color indicator, such as phenolphthalein, can be added with the alkaline solution or separately and the color change, if any, determined.

In another embodiment of the method of this invention, the approximate acid number of an oil sample having an acid number of at least a predetermined amount, can be ascertained by stepwise adding controlled amounts of the alkaline solution and mutual solvent to the oil sample. At the end of each of these stepwise additions of alkaline solution to the oil sample, a portion of the separated diluent layer is removed and a color indicator solution added thereto. A like amount of color indicator solution is then added to a standard solution. These method steps are continued until the color obtained in the thus treated diluent phase is identical to that of the thus treated standard solution. The approximate acid number can then be calculated by knowing the number of stepwise additions of alkaline solution which were necessary to produce identical colors in the diluent phase and standard solution.

---

The present invention relates to analytical testing, and more specifically, concerns an improved visual test method for accurately analyzing a sample having a color which interferes with the observation of a color change of a color-indicator solution. As such, the present invention is particularly suitable for use in the field testing of lubricating oils to determine whether their acid content is greater than a predetermined amount.

Acid testing of lubricating oils is an important technique employed in the refrigeration industry for ascertaining the acceptability of a particular sample for continued use and also as a means for evaluating over-all system contamination. Conventional methods for testing these oils are generally patterned after the ASTM D664-58 and ASTM D974-64 tests. These tests are not completely satisfactory as field tests for a number of reasons. For example, the D664-58 test requires the use of potentiometric equipment which is generally both unfamiliar and unavailable to individuals servicing refrigeration equipment. Similarly, the D974-64 test has the disadvantage when used with dark colored samples of obscuring the viewing of color changes produced by color-indicators such as, for example, p-naphtholbenzein solution. Accordingly, analysis of samples by the D974-64 test method must be confined to relatively clear samples.

The present invention was, therefore, developed as the result of a need for an accurate, easily performed field test for determining the acid content of lubricating oils having a color which interferes with the observation of a color change of a color-indicator solution.

In one embodiment of the method of the present invention an oil sample to be tested is mixed with an alkaline solution of known strength, the solvent of which is both colorless and immiscible with the oil. Thorough mixing of the alkaline solution and oil sample results in the acid content of the oil reacting with the basic content of the alkaline solution. The oil and solution are permitted to separate into individual phases and a color-indicator is used to ascertain if the pH of the solution phase is above or below a particular value.

This test method is particularly advantageous for testing oil samples to determine whether their acid content is greater than a predetermined amount. In such a test, the alkaline solution contains a quantity of base sufficient to completely neutralize an acid content in the oil sample equal to this predetermined amount. Accordingly, on testing of the colorless phase with a color-indicator, an alkaline condition thereof indicates that the oil contains less than the amount of acid considered to be undesirable. Similarly, an over-all acid condition of the colorless phase indicates that the oil sample contains a greater acid content than the predetermined amount.

It is important to note that the present invention finds utility in areas other than the acid testing of lubricant oils. In this connection, the method of the present invention can be broadly said to include the mixing of a sample to be tested with a liquid both immiscible therewith and which contains an ingredient that will react with the particular content of the sample to be analyzed. The immiscible liquid should have the further characteristic of not obscuring the observation of any color change in a color indicator. For example, if it were desired to ascertain the basic content of an oil sample, an aqueous acid solution immiscible with the oil could be employed. A pH sensitive color indicator, such as phenolphthalein, added to the colorless aqueous phase could be observed to denote any color change thereto and thereby provide an evaluation of the alkaline content of the oil phase. It should be noted that the concept of the present invention is not limited to acid-base reactions.

It is, therefore, an important object of the present invention to provide an improved visual test method for accurately analyzing samples having a color which obscures the observation of any color change in a color-indicator.

Another object of the present invention is to provide an improved method of analyzing lubricating oils for ascertaining their acid content without having the sample color interfere with, or obscure the observation of, a color change in a color-indicator.

Another object of the present invention is to provide an improved method for analytically testing a sample wherein the sample to be tested is first reacted with a liquid both immiscible therewith and containing an ingredient which will react with the particular content of the sample to be analyzed, the immiscible liquid being of a nature such that it enables unobscured visual examination of any color change in a color-indicator.

Another object of the present invention is to provide an improved method for the field testing of lubricating oils to determine whether their acid content is above a predetermined amount, wherein the acid content of the oil sample is extracted therefrom by means of a colorless alkaline solution which can, in turn, provide a medium for the unobscured observation of a color change in a color indicator solution.

Another object of the present invention is to provide an improved method for field testing of lubricating oils to determine their approximate acid concentration.

Other and further objects will be apparent from the following detailed description which particularly concerns the application of the present invention to the acid testing of lubricating oils.

New oils intended for use in refrigeration systems generally have an acid number of from 0.01 to 0.02 when measured by conventional ASTM test methods. This acid number represents the quantity of base, expressed in milligrams of potassium hydroxide (KOH), that is required to titrate all acidic constituents present in one gram of the sample that are strong enough to react with the KOH. Experience has shown that when the oil in a refrigerant system develops an acid concentration which corresponds to an acid number of from 0.05 to 0.07, it should be replaced with new or uncontaminated oil. Accordingly, in testing these oils, it is necessary that the accuracy of the test employed be sufficiently precise so as to distinguish between those oils which are acceptable and those which would be considered deemed unsuitable for continued use. As can well be appreciated, the acid number variation between new and unacceptable oil being only the difference between 0.02 and 0.05, requires that the test employed be unusually precise. In this regard, oil samples having a dark color interfere with the observation of color changes in a color-indicator and make such precise determinations difficult if not impossible. The method of the present invention overcomes this serious disadvantage to field testing by enabling the person performing the analysis to view the color change of the indicator used in a colorless medium.

Another important advantage of the present invention resides in the fact that it permits the measurement of the total acid content of the sample as opposed to the hydrogen ion concentration or pH of the sample. In this regard, total acid content is meant to include the associated and dissociated acids which are strong enough to react with the KOH. Accordingly, the test method of the present invention is responsive to the presence of both strong and weak acids in the oil sample. A pH measurement of the oil phase merely gives the hydrogen ion concentration value and does not provide a true indication of the total acid content, particularly where weak acids (those having low dissociation constants) are present in substantial quantities.

These unique advantages of the present invention are obtained in the acid testing of lubricating oil by reacting the acid content of the oil sample with an alkaline solution of known strength, the solvent component of which is immiscible with the oil. After the reaction has been completed, the solvent phase and oil phase are permitted to separate into individual layers and the solvent phase tested with a conventional color-indicator.

In accordance with this invention, predetermined amounts of the oil sample and alkaline solution are thoroughly mixed together so as to insure intimate contact of the acid content of the oil and the basic content of the alkaline solution. In this regard, it should be noted that an alkaline solution of 0.001 N KOH will neutralize completely an equal volume of oil sample having an acid number of between 0.05 and 0.07 (assuming a specific gravity for the oil of 0.8). After the alkaline solution and oil sample are thoroughly mixed, they are permitted to settle with the oil phase and water phase separating into individual layers or phases. The colorless water or aqueous phase of the mixture can then be tested with a color-indicator which is responsive to the pH of the aqueous phase.

The following is a specific example of a testing procedure embodying principles of the present invention and is particularly suitable as a field test to determine whether a given oil sample is acceptable for use in a refrigeration system.

A 10 ml. sample of oil to be tested is thoroughly mixed with a 10 ml. quantity of a 0.001 N aqueous KOH solution and a 10 ml. quantity of titration solvent composed of 50% toluene (reagent grade), 49.5% isopropyl alcohol (reagent grade) and 0.5% distilled water (all percentages being based on volume). Before being added to the oil sample, the titration solvent is adjusted to a pH of around 10 with dilute KOH in order to minimize its effect on the indicator solution which, in this example, is a 1% solution of phenolphthalein in ethanol (the color change of phenolphthalein takes place in the pH range of 8.3 to 10.0). Typical examples of other titration solvents which may be advantageously used alone or in conjunction with the above solvent composition include acetone, methylethyl ketone, methanol, ethanol, and other materials exhibiting affinity for both oil and water. In using other indicators, the pH of the titration is preferably adjusted to the pH range at which they produce a color change.

The oil sample, titration solvent, and aqueous KOH solution are thoroughly agitated in a test tube to provide complete mixing and contacting of the acid content of the oil with the alkaline solution. The contents of the test tube are then permitted to settle into separate layers, one of which being the oil layer and the other being the colorless aqueous layer which now contains the acid content of the oil which reacted with the KOH. This acid content now being in the form of a salt.

A color-indicator solution such as the above mentioned 1% solution of phenolphthalein in ethanol is now added. Any color change of the phenolphthalein is easily observed in the aqueous colorless phase of the sample. In particular, if, upon addition of the indicator solution, the colorless phase turns pink or red, this indicates that the oil has an acid number below the critical level and can continue to be used in a refrigeration system. On the other hand, if the colorless solution upon addition of the indicator remained colorless, this indicates that the acid number of the oil is greater than 0.07.

In the above described test procedure increasing the sample size to about 12 ml. or decreasing the normality of the KOH to 0.0008 would have the equivalence point more closely correspond to an acid number of 0.05.

The above procedure was used in performing the acid testing of a number of lubricant oils and the results thereof compared with the potentiometric titration procedure described in ASTM D664-58. The comparative results are as follows:

TABLE 1

| Sample No. | Acidity ASTM D664-58 | Color indication in aqueous phase | Interpretation |
| --- | --- | --- | --- |
| 1 | <0.01 | Light pink | Oil is of satisfactory acidity. |
| 2 | <0.01 | Pink | Do. |
| 3 | 0.02 | do | Do. |
| 4 | 0.03 | do | Do. |
| 5 | 0.05 | Light pink | Do. |
| 6 | 0.08 | Colorless | Oil is of unsatisfactory acidity. |
| 7 | 0.09 | do | Do. |
| 8 | 0.27 | do | Do. |
| 9 | 0.62 | do | Do. |

As is shown by the above data, oil samples 1–5, having an acid number of 0.05 or less (as measured by the ASTM D664-58 test procedure), produced a pink color indication which, based on experience, indicates that the oil is of satisfactory acidity and suitable for further use in a refrigeration system. Samples 6–9, however, had an ASTM D664-58 acid number of from 0.08 to 0.74 mg. KOH/per gram of sample. With each of these samples the aqueous phase remained colorless upon the addition of the phenolphthalein. These oils were unsatisfactory for further use by reason of their high acid contents. In this regard, it should be noted that the visual determination of a light pink color would be particularly difficult in the oil phase and is possible as a practical matter only when the observation thereof is made in a previously uncolored or unobscured phase such as is provided by the aqueous layer.

The following is a modification of the above test. In this version of the test of the present invention, 25 ml. of sample is placed in a separatory funnel together with 25 ml. of the same titration solvent mentioned in the previous example and 20 ml. of a 0.001 N aqueous KOH solution.

A stopper is then placed on the separatory funnel and it is shaken thoroughly to insure complete contact of the acid content of the oil with the KOH solution. The pressure developed during this step of the operation can be vented by opening the stop-cock occasionally when the funnel is in the inverted position.

After thorough mixing, the funnel is allowed to stand in an upright position until the water layer separates out at the bottom. A few milliliters of the water layer are then drained from the separatory funnel into a clean test tube and one drop of indicator solution (a 1% solution of phenolphthalein in ethanol) is added. The test tube is then thoroughly shaken and the resultant color noted. If the resultant color is pink or red, the oil is of satisfactory acidity. On the other hand, if the water layer remains colorless, this indicates that the oil sample is unsatisfactory for further use.

As was true in the previous example, any solvent may be employed which exhibits mutual solubility for both the oil and water phases. In this connection, as was true previously, the solvent should be adjusted so that its pH coincides with the pH at which the particular indicator solution employed changes color.

Table II below shows the results of testing the same samples given in the previous example by the somewhat modified testing method of the present example. In these tests unequal amounts of 0.001 N KOH and oil sample were mixed, i.e. 20 ml. of 0.001 N KOH to each 25 ml. of sample. Thus, the equivalence point in this test is different from that in the first test. In particular, in this test the equivalence point corresponds more closely to an acid number of 0.05 than it did in the first test.

TABLE II

| Sample No. | Acidity ASTM D664-58 | Color indication in aqueous phase | Interpretation |
| --- | --- | --- | --- |
| 1 | <0.01 | Pink | Oil is of satisfactory acidity. |
| 2 | <0.01 | do | Do. |
| 3 | 0.02 | do | Do. |
| 4 | 0.03 | do | Do. |
| 5 | 0.05 | do | Do. |
| 6 | 0.08 | Colorless | Oil is of unsatisfactory acidity. |
| 7 | 0.09 | do | Do. |
| 8 | 0.27 | do | Do. |
| 9 | 0.62 | do | Do. |

Each of the above examples is primarily concerned with a test procedure for ascertaining whether the acid concentration in the oil sample is above or below a predetermined value. The method of the present invention, however, can be used to determine the approximate concentration of acid in a sample. An example of such a use is given below.

In addition to the 0.001 N KOH solution, titration solvent and indicator solution used in the previous examples, the quantitative measurement method requires that a standard solution comprising 33.3% (by volume) isopropanol and 66.7% (by volume) 0.001 N KOH be prepared.

After the standard solution has been prepared, 25 ml. of the sample to be tested are added to a separatory funnel and thoroughly mixed with 25 ml. of the titration solvent and 20 ml. of the 0.001 N KOH aqueous solution. A stopper is then placed on the separatory funnel and it is sufficiently agitated to provide complete contact of the acid content with the KOH solution. The water and oil layers are then allowed to separate out and a few ml. of the water layer are then drained from the funnel into a clean test tube. One drop of indicator solution (1% solution of phenolphthalein in ethanol) is added to the test tube. Similarly, one drop of indicator solution is added to the standard solution. If the color of the liquid taken from the sample is identical to that of the standard solution or, if it is pink, the oil has an acid number of less than 0.05. It no color was developed in the water layer from the sample, the entire water layer in the separatory funnel is drained and discarded. An additional 20 ml. of 0.001 N KOH solution is then added to the oil sample in the funnel. After complete mixing, the funnel is place in an upright position and the oil and water layers are allowed to separate. A few milliliters of the water layer are then drained into a test tube and one drop of indicator solution added thereto. Any color change to this water layer is noted and then compared with that of the standard solution to which one drop of indicator has been added.

This procedure is repeated until the color of the water layer is the same as the standard solution to which the indicator was previously added. The total numbers of shake-outs or separate additions of KOH solution are then counted and substituted in the following formula to determine the approximate acid number:

$$Y = 0.05X - 0.05$$

where Y equals the approximate acidity (acid number as compared to that obtained by ASTM D664–58 techniques) and X equals the number of shake-outs. For example, if six shake-outs were needed before the color of the drained water layer matched that of the standard solution to which one drop of indicator had been added, the ASTM acid number would be approximately 0.25.

The above equation was derived from data obtained in a number of sample tests made in accordance with the techniques described in the last example. An ASTM D664–58 test analysis was made on each of these samples and a plot made of the data. The number of shake-outs until color of the water layer matched the standard was the abscissa and the ASTM D664–58 determination was the ordinate. As such, this equation and the method of the last referred to example represent a convenient and easily performed field test procedure for approximately determining the acid number of an oil sample without the use of potentiometric or titration equipment.

Certain other modifications and variations of this invention as hereinbefore set forth may be made without departing from the spirit and scope thereof. Accordingly, only such limitations should be imposed as are indicated in the appended claims.

We claim:

1. The method of field testing an oil sample to determine if its acid content is above a predetermined level, comprising the steps of combining predetermined quantities of an oil sample and alkaline solution, said alkaline solution being of known normality and having a diluent constituent which is substantially immiscible with said oil sample and having the further characteristic of not interfering with the observation of a color change of a color indicator solution, adding a mutual solvent to said oil sample and alkaline solution, said mutual solvent being characterized by substantially, equal solubility in both said oil solution and alkaline solution, thoroughly mixing said oil sample, alkaline solution and mutual solvent to effect complete contact of the acid content of said sample with the alkaline constituent of said alkaline solution, allowing the oil and alkaline solution to separate into an oil phase and a diluent phase and adding a color indicator to the separated diluent phase and observing any color change therein.

2. The method of claim 1 wherein said mutual solvent is selected from the group consisting of toluene, isopropanol, acetone, methylethyl ketone, methanol and ethanol.

3. The method of field testing a lubricating oil to determine whether the acid number of such lubricating oil is below 0.05, said method comprising the steps of mixing a quantity of an oil sample with an equal quantity of an aqueous solution of 0.001 N KOH, adding a mutual solvent to said mixture which is substantially equally soluble in oil and water, agitating said mixture so as to insure complete and intimate contact of the acid constituent of said oil sample with the alkaline constituent of said KOH solution, separating the oil sample and KOH aqueous solution into individual phases and adding at least one drop of a phenolphthalein indicator to said aqueous phase, whereby on observing said aqueous phase, a pink or red color thereof indicates that the oil sample has an acid number below 0.05.

4. The method of claim 3 wherein said solvent is selected from the group consisting of toluene, isopropanol, acetone, methylethyl ketone, methanol and ethanol.

5. The method of field testing an oil sample to determine if its acid content is above a predetermined level, comprising the steps of combining predetermined quantities of an oil sample and alkaline solution, said alkaline solution being of known normality and having a diluent constituent which is substantially immisicible with said oil sample and having the further characteristic of not interfering with the observation of a color change of a color indicator solution, adding a mutual solvent consisting essentially of toluene and isopropanol to said oil sample and alkaline solution, said mutual solvent being characterized by substantially equal solubility in both said oil solution and alkaline solution, thoroughly mixing said oil sample, alkaline solution and mutual solvent to effect complete contact of the acid content of said sample with the alkaline constituent of said alkaline solution, allowing the oil and alkaline solution to separate into an oil phase and a diluent phase and adding a color indicator to the separated diluent phase and observing any color change therein.

6. The method of field testing a lubricating oil to determine whether the acid number of such lubricating oil is below 0.05, said method comprising the steps of mixing a quantity of an oil sample with an equal quantity of an aqueous solution of 0.001 N KOH, adding a mutual solvent comprising toluene and isopropanol to said mixture which is substantially equally soluble in oil and water, agitating said mixture so as to insure complete and intimate contact of the acid constituent of said oil sample with the alkaline constituent of said KOH solution, separating the oil sample and KOH aqueous solution into individual phases and adding at least one drop of a phenolphthalein indicator to said aqueous phase, whereby on observing said aqueous phase, a pink or red color thereof indicates that the oil sample has an acid number below 0.05.

7. A method for determining the approximate acid number of an oil sample which comprises the steps of combining approximately 25 parts (by volume) of an oil sample to be tested with approximately 20 parts (by volume) of a 0.001 N KOH aqueous solution and approximately 25 parts (by volume) of a mutual solvent, said solvent being characterized by substantially equal solubility in both said oil sample and said aqueous KOH solution, thoroughly mixing these materials and allowing the water and oil layers to separate, removing a first portion of the water layer and adding at least one drop of color indicator solution to said first portion which is adapted to change color in the presence of an alkaline environment, adding an equal amount of said color indicator solution to a standard solution composer of approximately 33.3% isopropanol and 66.7% 0.001 N KOH (said percentages being based on volume), comparing the color of said first portion of said water layer with said standard solution whereby if said first portion of said water layer exhibits a color identical to that developed in said standard solution, the oil will have an acid number of less than 0.05, but if no color is developed in said first water layer portion, said method further comprises then removing the entire water layer from said oil-KOH mixture and adding 20 ml. of 0.001 N KOH solution to said oil sample with complete mixing, allowing the oil and water layers to separate, removing a second portion of water from said water layer, adding at least one drop of said color indicator solution to said second portion of water, adding an identical amount of said color indicator solution to said standard solution, comparing the color change in said second portion of water to that developed in the standard solution, repeating this procedure until the color in the water layer is the same as the color in the standard solution, and then determining the acid number of said oil sample from the following formula:

$$Y = 0.05X - 0.05$$

where Y equals the approximate acid number and X equals the number of separate additions of KOH solution.

References Cited

UNITED STATES PATENTS

| | | | |
|---|---|---|---|
| 2,309,651 | 2/1943 | McCullough et al. | 208—232 |
| 2,967,825 | 1/1961 | Baniel | 23—312 X |
| 3,193,356 | 6/1965 | Smith | 23—230 |

MORRIS O. WOLK, Primary Examiner

E. A. KATZ, Assistant Examiner

U.S. Cl. X.R.

23—312; 208—233, 323